United States Patent [19]

Betso et al.

[11] Patent Number: 5,175,222
[45] Date of Patent: Dec. 29, 1992

[54] PROCESS FOR PREPARING EXTRUDABLE POLYMERIC VINYLIDENE CHLORIDE COMPOSITION

[75] Inventors: Stephen R. Betso, Midland; Duane F. Foye, Merrill, both of Mich.

[73] Assignee: The Dow Chemical Company, Midland, Mich.

[21] Appl. No.: 649,246

[22] Filed: Jan. 31, 1991

Related U.S. Application Data

[63] Continuation of Ser. No. 418,931, Oct. 6, 1989, abandoned, which is a continuation of Ser. No. 240,019, Sep. 2, 1988, abandoned.

[51] Int. Cl.$^5$ .............................................. C08F 2/20
[52] U.S. Cl. .................................. 526/193; 526/195; 526/210; 526/213; 526/216; 526/233; 526/234; 526/329.4
[58] Field of Search ............... 526/195, 193, 216, 210, 526/213, 233, 234, 236

[56] References Cited

U.S. PATENT DOCUMENTS

| | | | |
|---|---|---|---|
| 2,604,459 | 7/1952 | Jankowiak . | |
| 3,813,373 | 5/1974 | Ito | 526/233 |
| 4,303,564 | 12/1981 | Kuroshima . | |
| 4,418,168 | 11/1983 | Johnson . | |
| 4,507,378 | 3/1985 | Wada | 430/137 |
| 4,686,148 | 8/1987 | Havens . | |
| 4,698,111 | 10/1987 | Havens . | |
| 4,824,886 | 4/1989 | Schmidt | 524/131 |

FOREIGN PATENT DOCUMENTS 9185 4/1970 Japan .

*Primary Examiner*—Christopher Henderson

[57] ABSTRACT

The present invention is a polymer composition comprising vinylidene chloride with improved thermal stability. The process comprises either advance addition or polymer slurry addition of a salt of a non-alkenic weak acid during the polymerization of the vinylidene chloride. The polymeric composition comprises a reaction product of a salt of a nonalkenic weak acid in an amount effective to provide improved thermal stability to the polymeric composition. In a preferred embodiment, the present invention further comprises adding a salt of a carboxylic acid to the polymer slurry.

7 Claims, No Drawings

PROCESS FOR PREPARING EXTRUDABLE POLYMERIC VINYLIDENE CHLORIDE COMPOSITION

CROSS-REFERENCE TO RELATED APPLICATION

This is a continuation of application Ser. No. 418,931, filed Oct. 6, 1989, now abandoned which is a continuation of application Ser. No. 240,019 filed Sep. 2, 1988 now abandoned.

FIELD OF THE INVENTION

The present invention relates to a thermally sensitive plastic possessing decreased thermal sensitivity and its method of preparation.

BACKGROUND OF THE INVENTION

Vinylidene chloride interpolymers are well-known in the prior art. Such polymers are also well-known to be thermally sensitive, which means that upon exposure to desirable processing temperatures such polymers tend to thermally decompose, e.g., generate carbonaceous material contamination, discolor or evolve hydrogen chloride.

In the past, the practice has been to extrude polymeric compositions comprising a vinylidene chloride interpolymer directly from the form in which it is recovered. Because of the convenience of shipping and it is desirable to form such polymeric compositions into pellets prior to final extrusion. As the demand for pellets has increased, the demand has increased for a pellet which can withstand the myriad processing conditions to which powdered resins are subjected.

While pellets of polymeric compositions comprising vinylidene chloride interpolymers may be an advantageous form from which to fabricate articles, the pellets of such polymeric compositions are particularly difficult to extrude. Pellet formation requires an exposure of the thermoplastic composition to heat prior to the conventional extrusion step of the polymeric composition into articles. This additional heat history is believed to make the vinylidene chloride interpolymer in pellet form even more susceptible to thermal instability than a vinylidene chloride interpolymer in powder form. Consequently, additive packages which improve the thermal stability of polymeric compositions comprising vinylidene chloride interpolymer in powder form do not necessarily improve the thermal stability of such polymeric compositions in pellet form.

Although satisfactorily extrudable for a relatively short period, it has been found that attempts to extrude vinylidene chloride interpolymer pellets over long periods on certain extrusion equipment have also proven unsatisfactory due to the thermal sensitivity of the vinylidene chloride interpolymer and, consequently, an undesirable level of carbonaceous material contamination, increased discoloration, or higher hydrogen chloride in the extrudate.

It is desirable to produce a polymeric composition which possesses less carbonaceous material contamination, less discoloration or less hydrogen chloride evolvement than vinylidene chloride interpolymer alone; and which can be extruded, in either powder or pellet form, into an extrudate which possesses less carbonaceous material contamination, less discoloration or less hydrogen chloride evolvement than an extrudate formed from vinylidene chloride interpolymer alone. It is to this goal that the present invention is directed.

SUMMARY OF THE INVENTION

The present invention is an improved method for making a polymeric composition, the steps of the method comprising:
(A) forming a polymerizable monomer mixture having an aqueous phase and a monomer phase comprising vinylidene chloride monomer in an amount of from about 60 to about 99 weight percent and at least one ethylenically unsaturated comonomer copolymerizable therewith in an amount of from about 40 to about 1 weight percent, said weight percents being based on the weight of the monomer mixture:
(B) polymerizing the polymerizable mixture to form a polymer slurry having an aqueous phase and a monomer phase: and
(C) drying the slurry to form a polymeric composition;
the improvement comprising adding to either the polymerizable mixture or the polymer slurry, at a time from the beginning of step (A) to prior to the completion of step (C), an amount of at least one salt of a nonalkenic weak acid having a solubility of greater than 0.1 percent by weight in the aqueous phase with the pH of the aqueous phase being at an effective value to provide a reaction product in the polymeric composition in an amount effective to improve the color stability of the polymeric composition polymeric composition comprising (1) a vinylidene chloride interpolymer having polymerized therein vinylidene chloride monomer in an amount of from about 60 to about 99 percent by weight of interpolymer and at least one ethylenically unsaturated comonomer copolymerizable therewith in an amount of from about 40 to about 1 percent by weight of interpolymer; and (2) the reaction product of from about 0.01 to about 5 weight percent of a salt of a nonalkenic weak acid based on the weight of the polymeric composition.

DETAILED DESCRIPTION OF THE INVENTION

The present invention concerns a polymeric composition having improved extrudability. The polymeric or plastic composition comprises a vinylidene chloride interpolymer and a reaction product of a nonalkenic weak acid to form a polymeric or plastic composition. By "polymeric or plastic" composition is meant to include the vinylidene chloride interpolymer and reaction product of a nonalkenic weak acid, as well as other additives. The amount of vinylidene chloride interpolymer is at least 80 percent by weight, based on the weight of the total composition, Preferably, the amount of vinylidene chloride interpolymer is at least 90 percent by weight, based on the weight of the total composition For the purposes of this invention, improved extrudability means that if subjected to desirable elevated processing temperatures, the polymeric composition is less thermally sensitive and consequently, the extrudate possesses a reduced level of carbonaceous material contamination, reduced discoloration or less hydrogen chloride evolvement.

By "extrudate" is meant any composition which becomes partially or totally melted when subjected to elevated temperatures during processing methods, e.g., casting, blowing, extrusion molding, injection molding, blow molding, coextrusion, laminating or calendering.

The term "vinylidene chloride interpolymer" encompasses homopolymers, copolymers, terpolymers, etc. of vinylidene chloride. The polymeric compositions suitable for use in the present invention are those vinylidene chloride interpolymers prepared from a monomer mixture comprising a predetermined amount of vinylidene chloride monomer and also a predetermined amount of ethylenically unsaturated comonomer copolymerizable therewith.

In preparing the monomer phase, such phase comprises a mixture containing essentially all of the monomer to be polymerized. An effective amount of polymerized vinylidene chloride monomer is generally in the range of from about 60 to about 99 percent by weight of interpolymer, with the preferred ranges, as is known to the skilled artisan, dependent upon the ethylenically unsaturated comonomer copolymerized therewith.

The amount of ethylenically unsaturated comonomer is maintained below an amount effective to destroy the semicrystalline character of the interpolymer. By "semicrystalline character" it is meant that the interpolymer has between about 5 percent and about 99 percent crystallinity. Crystallinity values depend upon the measuring technique, and as used herein crystallinity is defined by the commonly used density method. See, for example, the discussion by R. A. Wessling, in Chapter 6 of Polyvinylidene Chloride, Vol. 5, Gordon and Breach Science Publishers, New York (1977), the teachings of which are incorporated herein by reference.

The effective amount of ethylenically unsaturated comonomer or comonomers copolymerizable with the vinylidene chloride monomer are present in the monomer mixture in an amount of from about 1 to about 40 weight percent, said weight percents being based on total monomer mixture weight.

Suitable ethylenically unsaturated comonomers copolymerizable with the vinylidene chloride monomer include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate and methylmethacrylate.

When the ethylenically unsaturated comonomer employed is vinyl chloride, the vinyl chloride will preferably be present in an amount of from about 30 to about 5 percent by weight of interpolymer and vinylidene chloride will be present in an amount of from about 70 to about 95 percent by weight of interpolymer; and more preferably the vinyl chloride will be present in an amount of from about 25 to about 10 percent by weight of interpolymer and the vinylidene chloride will be present in an amount of from about 75 to about 90 percent by weight of interpolymer.

When the ethylenically unsaturated comonomer employed is an alkyl acrylate, the alkyl acrylate will preferably be present in an amount of from about 30 to about 2 percent by weight of interpolymer and the vinylidene chloride will be present in an amount of from about 98 to about 70 percent by weight of interpolymer and preferably the alkyl acrylate will be present in an amount of from about 40 to about 6 percent by weight of interpolymer and the vinylidene chloride will be present in an amount of from about 94 to about 60 percent by weight of interpolymer.

Methods of forming the vinylidene chloride interpolymers are well-known in the prior art. The vinylidene chloride interpolymer is generally formed through an emulsion or suspension polymerization process. Exemplary of such processes are U.S. Pat. Nos. 2,558,728; 3,007,903; 3,642,743; and 3,879,359; and the methods described by R. A. Wessling, in Polyvinylidene Chloride, Gordon and Breach Science Publishers, New York (1977), Chapter 3; all of which are incorporated herein by reference.

In the emulsion or suspension process, a monomer phase is suitably emulsified or suspended in an aqueous phase through the use of emulsifying or suspending agents. An initiator and surface active agent capable of emulsifying or suspending the monomeric materials in the aqueous phase is then added to the solution and polymerization of the monomers allowed to proceed until achieving its desired degree of conversion. The polymerization of the monomeric materials is usually carried out with heating and agitation.

A relatively small amount of a water-soluble suspending agent or emulsifying agent is used as hereinafter described, and the predominant proportion of monomer is uniformly admixed along with at least about 0.01 weight percent, preferably between about 0.1 and 1 weight percent, said weight percent being based on the weight of the monomer, of the water-soluble dispersing agent, and between about 0.1 and 0.5 weight percent of a monomer-soluble polymerization initiator.

Exemplary water-soluble suspending or emulsifying agents are the water-soluble alkyl or hydroxyalkyl cellulose ethers wherein the alkyl group contains 1 to 2 carbon atoms and the hydroxyalkyl groups contain from 2 to 4 carbon atoms. Any viscosity grade of the cellulose ethers may be used although it is preferred to use the lower viscosity grades such as 10 cps to 400 cps. The low viscosity grades of methyl cellulose and hydroxypropyl methyl cellulose are more easily dissolved in water than the higher viscosity grades. By viscosity grade as herein used is meant the viscosity of a 2 percent aqueous solution of the cellulose ether measured at 20° C. The process of this invention prepares a polymer in granular or bead form which is readily isolatable from the polymerization system by simple means, such as filtration. Washing with water will remove most of the residual components of the dispersant and catalyst system.

Exemplary initiators contemplated for use in the present invention include the peroxides, such as hydrogen peroxide, isopropyl peroxypercarbonate, lauroyl peroxide or mixtures thereof.

Although the order of addition of the various ingredients is not critical, it is preferred to prepare the complete aqueous phase including initiator, and emulsifier or suspending agent, and then to add the monomer phase. In preparing the aqueous phase, it has been found to be most convenient, although not critical, to solubilize the emulsifier or suspending agent, and then to add the initiator. Although the amount of water used has little effect on the process, it is preferred to operate the polymerization process in the range of from about 2 to about 4 parts per water per part of monomer. When less water is used, there may be insufficient heat transfer to carry away the heat of polymerization.

Except as specifically set forth herein, polymerization conditions (e.g., temperature and agitation) are those conventionally employed in the polymerization of vinylidene chloride.

When the monomer is added to the aqueous phase (monomer-in-water phase), the mixture is heated with agitation, in the substantial absence of oxygen, to a temperature of between about 25° C. and 85° C. and preferably between about 45° C. and about 60° C., for a period sufficient to provide the desired conversion of monomer to polymer. Generally, the conversion of monomer to polymer is between about 80 and 99 weight percent, and preferably between about 88 and 95 weight percent.

After polymerization is complete, the resulting suspension or emulsion slurry of vinylidene chloride interpolymer is then vacuum stripped to form a monomer-free slurry. Thereafter, the slurry is cooled down, unloaded and dewatered, and vinylidene chloride interpolymer is collected and further dried. The resin may be subsequently hydrated to reform the polymer slurry. The process may also include using prefilter, an electrofilter and a final dryer such as a fluid energy dryer, and the like.

The salt of a nonalkenic weak acid is a composition selected to be soluble or partially soluble and which will not adversely affect the properties of the vinylidene chloride interpolymer. The salt of a nonalkenic acid is dissociated by water and is at least partially ionized and solvated, and which contains no —C=C— bonds in its structure. By "soluble or partially soluble" is meant that the nonalkenic weak acid salt will have a solubility greater than about 0.1 percent by weight in the aqueous phase, preferably, about 0.5 percent by weight in the aqueous phase, and most preferably about 1 percent by weight in the aqueous phase. Solubility will be affected by temperature, pressure, pH and other species in the composition; these factors are known to those skilled in the art and their effect upon this invention may be readily determined without undue experimentation.

The nonalkenic weak acid is selected from the following acids, or derivatives thereof, boric acid, hexapolyphosphoric acid, hypophosphoric acid, orthophosphoric acid, pyrophcsphoric acid, phosphorous acid, tetrapolyphosphoric acid, tripolyphosphoric acid, alkyl monocarboxylic acid, aryl monocarboxylic acid, alkyl polycarboxylic acid, aryl polycarboxylic acid, hydroxyalkyl monocarboxylic acid, hydroxyalkyl polycarboxylic acid.

The salt may be selected from alkali metals (Group IA of the Periodic Table) and alkali earth metals (Group IIA of the Periodic Table).

Generally suitable nonalkenic weak acid salts may be culled from the above list of candidates based upon whether any of the following properties are adversely affected by the addition of the nonalkenic weak acid salt of the vinylidene chloride interpolymer alone, the vinylidene chloride interpolymer in a formulated resin, or the vinylidene chloride interpolymer in an extruded product:

(1) Effects on oxygen and gas permeability may be indirectly measured by differential scanning calorimetry to determine if the glass transition temperature of the vinylidene chloride interpolymer is altered or may be directly measured, for example, by using an OX-TRAN 1050, commercially available from Modern Controls, Inc.

(2) Taste and odor properties may be determined preliminarily by reviewing the composition f the nonalkenic weak acid salt. Certain structures can, under varying conditions, sometimes adversely affect the taste and odor properties of the vinylidene chloride interpolymer; likewise, certain structures can, under varying conditions, sometimes generate by-products which could adversely affect the taste and odor properties of the vinylidene chloride interpolymer extrudate, e.g., esters can hydrolyze releasing the free alcohol. Generally, sulfur and nitrogen containing structures tend to be odoriferous and have similar by-products. Further, ketone or aldehyde structure tend to be detectable at low levels by taste and odor.

(3) Color and carbonaceous material contamination may be measured by inspecting an extrudate after running comparative extrusion trials on a $\frac{3}{4}''$ Brabender tape extrusion at ~175° C. between a vinylidene chloride resin containing the nonalkenic weak acid salt and the resin without the nonalkenic weak acid salt.

(4) Thermostability may be measured by differential scanning calorimetry or thermogravimetric analysis to determine if the nonalkenic weak acid salt accelerates decomposition of vinylidene chloride interpolymer.

(5) Finally, certain structures can be excluded because of their toxicological properties and because they may not be acceptable in certain food—contact applications. Such compounds may be culled after review of regulations published by the Food and Drug Administration, and other similar governmental agencies.

Exemplary salts of nonalkenic inorganic weak acids include phosphate salts and derivatives thereof such as sodium phosphates (e.g., tetrasodium pyrophosphate, sodium pyrophosphate, sodium orthophosphate, sodium polyphosphate), the potassium phosphates (e.g. potassium pyrophosphate, potassium orthophosphate, potassium polyphosphate); salts of weak nonalkenic organic acids such as methyl trisodium pyrodphosphate, sodium alkyl or aryl phosphates, phosphites and sulfates; salts of nonalkenic carboxylic acids (e.g., sodium oxalate, sodium citrate, potassium acetate): salts of nonalkenic dicarboxylic acids such as succinic acid (e.g., sodium succinate, potassium succinate, lithium succinate); mixtures thereof and the like.

Salts of nonalkenic weak acids suitable for purposes of the present invention are prepared by processes well-known in the art. By way of illustration only, techniques for preparing tetrasodium pyrophosphate are set forth in *The Merck Index*, 10th Edition (1983), which is hereby incorporated by reference.

As previously discussed, the nonalkenic weak acid may be added, at a time from the beginning of forming the polymerizable monomer mixture and prior to the completion of drying the slurry to form a polymeric composition, to either the polymerizable mixture or the polymer slurry. The salt of a nonalkenic weak acid may be added to the monomers before they are copolymerized into a vinylidene chloride interpolymer, i.e., advance addition, or the salt of nonalkenic weak acid may be added to a vinylidene chloride interpolymer dispersion, i.e., polymer slurry addition. Furthermore, the aforementioned two methods, advance addition and polymer slurry addition, may be applied in combination. However, the advance addition is preferred because the salts of the nonalkenic weak acid are more evenly dispersed in and throughout the resultant polymerization product.

According to the present invention, the nonalkenic weak acid salt can be formed prior to aqueous dissolution or by in situ combination of a salt with the acid or acid derivative. At least one salt of a nonalkenic weak acid is loaded in a reactor with the monomer mixture or the resultant polymer slurry an amount to provide a reaction product in the polymeric composition in an amount effective to improve the color stability of the polymeric composition. Generally, at least one salt of a nonalkenic weak acid will be added in an amount of from about 0.001 to about 10 weight percent, based on the weight of the monomer mixture or polymer slurry. The reaction product of the salt of a nonalkenic weak acid will generally be present in the resulting dried polymeric composition in an amount of about 0.01 to about 5 weight percent, preferably about 0.05 to about 3 weight percent and most preferably about 0.1 to about 1 weight percent, as calculated whereby it is assumed that all the acidic protons are replaced with sodium ions.

In another embodiment, an alkenic carboxylic acid or salt may be applied via polymer slurry addition. That is, the alkenic carboxylic acid or salt may be added consecutively with the salt of a nonalkenic weak acid to the polymer slurry.

The alkenic carboxylic acid or salt will be added in an amount of from about 0.001 to about 10 weight percent, whereby the resultant polymeric composition contains a reaction product of the alkenic carboxylic acid or salt in an amount effective to provide an improved color stability of the polymeric composition. The reaction product of the alkenic carboxylic acid or salt will generally be present in the resulting dried polymeric composition in an amount of about 0.01 to about 5 weight percent, preferably about 0.05 to about 3 weight percent and most preferably about 0.1 to about 1 weight percent.

Exemplary alkenic carboxylic acids or salts include acrylic acid, oleic acid, linoleic acid, linolenic acid, and dicarboxylic acids such as fumaric acid, and maleic acid and salts thereof. In a preferred embodiment, the mixture comprises a salt of a nonalkenic weak acid such as tetrasodium pyrophosphate and an alkenic carboxylic acid or salt such as maleic acid, or its salt.

Salts of alkenic carboxylic acids suitable for purposes of the present invention are prepared by processes well-known in the art. By way of illustration only, techniques for preparing maleic acid are set forth in the *Merck Index*, 10th Edition (1983), which is hereby incorporated by reference.

Generally, "reaction product" means that the relevant materials added together cannot be removed in their original form. For the present invention, "reaction product" specifically refers to the phenomena of the salt of the nonalkenic weak acid and alkenic carboxylic acid or salt becoming hydrated, protonated or deprotonated, whereby its composition is changed. Because the salt of a nonalkenic weak acid will dissolve in water, it will hydrolyze to form a variety of species. Upon subsequent drying and reduction of the composition it may not revert to its initial structure or composition. Thus, this invention differs from dry blending the components of the polymeric composition, because a reaction product will not form.

The exact amount of the salt of a nonalkenic weak acid which is initially added to be solubilized in the aqueous phase of the the monomer mixture or polymer slurry will depend on the pH of the aqueous phase of the monomer mixture or polymer slurry, respectively: the pH profile, i.e., the change in pH during the reaction: the phase ratio of the monomer mix, i.e., monomer to aqueous ratio; and the solubility of the nonalkenic weak acid salt in the aqueous phase. Once the above parameters are selectively determined, a skilled artisan will be able to determine the amount of salt which is necessary without undue experimentation.

Although not intended to be bound by theory, it is believed that the salt of a nonalkenic weak acid acts as an HCL scavenger to provide an effective reduction in the amount of free HCL in the polymeric composition. Acid scavenging is related to the number of basic sites in the reaction product moiety. One skilled in the art will recognize that this is inversely related to the number of protons on that same moiety.

As is known by one skilled in the art, the pH of the monomer mixture aqueous phase must be maintained in the range of from about 3 to about 12, for a period varying inversely with the amount of time during which the pH is outside of the prescribed range. The inventors have found, however, that for the practice of the present invention, the pH of the aqueous phase of the polymer slurry must also be maintained within a selected range. If, after addition of the salt of a nonalkenic weak acid, the pH of the aqueous phase in the polymer slurry is too high or too low, discoloration of the polymeric composition may occur.

The pH of the slurry after polymerization is generally in the range of about 2 to about 5. Generally, the interpolymer may be maintained in the polymer slurry when it has an extreme pH above about 12 or below about 3 for a period varying inversely with the amount of time during which the pH is outside of the prescribed range. The selection of the specific pH of the aqueous phase of polymer slurry may be determined by one of ordinary skill in the art without undue experimentation.

The pH of the slurry will be dependent upon a number of factors, and may be determined by one skilled in the art without undue experimentation. Exemplary factors include the salt of the nonalkenic weak acid and, optionally, the alkenic carboxylic acid or salt employed; the stage when the salt of the nonalkenic weak acid and, optionally, the alkenic carboxylic acid or salt are added to the monomer mixture; the polymerization initiator chosen; the extent of dehydrochlorination of the polymer and any water-soluble species added to facilitate polymerization. For salts of weak nonalkenic organic acids; salts of nonalkenic carboxylic acids; and salts of nonalkenic dicarboxylic acids and mixtures thereof, maximum basic sites are are reached at a pH value basic of pH 3-5, while for phosphate salts and derivatives thereof, maximum basic sites are reached at a pH value basic of pH 5.

The polymeric composition will generally contain substantially all of the hydrolyzed salt species: the relative level of each salt species will be dependent upon the pH of either or both the monomer mixture and slurry. Tetrasodium pyrophosphate, for example, will hydrolyze to form the pyrophosphate anion, monohydrogen pyrophosphate, dihydrogen pyrophosphate, trihydrogen pyrophosphate and tetrahydrogen pyrophosphate. Thus, this invention differs from the blending of a dry powder and a vinylidene chloride interpolymer to form a uniform mixture, because composition of the powder will not change.

Once the above parameters are determined, a skilled artisan will be able to adjust the pH of the slurry to achieve the desired decrease in polymeric composition discoloration without undue experimentation.

A variety of additives may be incorporated in the polymeric composition of the present invention. Additive type and amount thereof will depend upon several factors. One factor is the intended use of the polymeric composition. A second factor is tolerance of the polymeric composition for the additives. That is, how much additive can be added before the physical properties of the polymeric composition are adversely affected to an unacceptable level. Other factors are apparent to those skilled in the art of polymer formulation and compounding.

Additives which may be incorporated into the polymeric composition of the present invention are selected from the group consisting of plasticizers, heat stabilizers, light stabilizers, pigments, processing aids, lubricants and the like. Each of these additives is known and several types of each are commercially available.

Blending of the additives in forming the polymeric composition can be accomplished by using conventional melt processing, as well as dry blending techniques. The additives may be blended concurrently with the vinylidene chloride interpolymer, or may be consecutively blended with the vinylidene chloride interpolymer.

In using conventional processing equipment for thermally sensitive polymers, three conditions should be met. Two conditions which are interrelated are processing time and processing temperature. In melt processing polymers, it is generally recognized that as processing temperatures increase, processing times must decrease in order to avoid undesirable results such as polymer decomposition. Melt processing must be accomplished at a temperature below that at which decomposition of the vinylidene chloride interpolymer becomes significant. A third condition is that sufficient mixing must be generated during melt processing to provide a visually homogeneous blend, i.e., no visible solids, with a reasonable mixing time.

Exemplary melt processing equipment includes heated two-roll compounding mills, Brabender mixers, Banbury mixers, single screw extruders, twin screw extruders, and the like, which are constructed for use with thermally sensitive polymers. See, for example, the discussion by R. A. Wessling, in Chapter 11 of *Polyvinylidene Chloride*, Vol. 5, Gordon and Breach Science Publishers, New York (1977), the teachings of which are incorporated herein by reference. Desirable results are obtained when an extruder, either a single screw or a twin screw, is used for melt processing the components of the polymeric composition.

When dry blending, the components should be mixed to form a visually uniform admixture. Suitable dry blending equipment includes Hobart mixers, Welex mixers, Henschel High intensity mixers and the like.

Methods of forming the polymeric composition into pellets are well-known to those skilled in the art. Any method capable of forming the polymeric composition into pellets is suitable for use in the present invention. For the purposes of this application, the terms "pellet" or "pellets" refer to particles having a minimum cross-sectional dimension of at least 1/32 inch, preferably of at least 1/16 inch and most preferably of at least ⅛ inch; said pellets suitably have a maximum cross-sectional dimension of at least ½ inch, preferably of at least ⅜ inch and most preferably of at least ¼ inch. An exemplary method of forming the polymeric composition into pellets includes extruding the polymeric composition through a strand die to form an extruded strand, and then chopping the extruded strand into pellets.

The polymeric composition, in either powder or pellet form, may be fabricated into any suitable final product, e.g., a variety of films or other articles. As is well-known in the art, films and articles are fabricated with conventional coextrusion, e.g., feedblock coextrusion, multimanifold die coextrusion or combinations of the two; injection molding; coinjection molding; extrusion molding and lamination techniques. Articles formed therefrom include blown and cast, mono- and multilayer, films; rigid and foam sheet; tubes; pipes; rods; fibers and various profiles. Lamination techniques are particularly suited to produce multi-ply sheets. As is known in the art, specific laminating techniques include fusion, i.e., whereby self-sustaining lamina are bonded together by applications of heat and pressure; wet combining, i.e., whereby two or more plies are laminated using a tie coat adhesive, which is applied wet, the liquid driven off and combining by subsequent pressure laminating in one continuous process; or by heat reactivation, i.e., combining a precoated film with another film by heating and reactivating the precoat adhesive so that it becomes receptive to bonding after subsequent pressure laminating.

Exemplary articles include rigid containers used for the preservation of food, drink, medicine and other perishables. Such containers should have good mechanical properties, as well as low gas permeabilities too, for example, oxygen, carbon dioxide, water vapor, odor bodies or flavor bodies, hydrocarbons or agricultural chemicals. Consequently, multilayer sheet structures employed in packaging materials have organic polymer skin layers laminated on each side of a vinylidene chloride interpolymer barrier layer, generally with glue layers used to promote adhesion between the barrier layer and dissimilar material layers.

The present invention is illustrated in further detail by the following examples. The examples are for the purposes of illustration only, and are not to be construed as limiting the scope of the present invention. All parts and percentages are by weight unless otherwise specifically noted.

EXAMPLES

Examples 1-9

A polymeric composition is formed from a monomer mixture through a suspension polymerization process. Into a ten-gallon stirred polymerization reactor is loaded 9000 grams of a mixture comprising about 94 weight percent of vinylidene chloride monomer and about 6 weight percent of methyl acrylate. To the mixture in the reactor is added 16,500 grams of demineralized water, 0.4 gram of di-tert-butylmethylphenol; 42 grams of t-butyl peroctoate, 8.5 grams of tetrasodium pyrophosphate as a trace metal scavenger and 19 grams of hydroxypropyl methylcellulose ether as a suspending agent. The pH of the monomer mixture should be between about 4-10, and adjusted as necessary.

The reactor is sealed, purged with nitrogen and elevated to a temperature of about 25° C. After polymerization has begun, the temperature is raised to 80° C. and polymerization is allowed to continue for about 16 hours.

About 45 grams of tetrasodium pyrophosphate is charged into the resultant polymer slurry. The polymer slurry of polymeric material has a pH of about 2-4. The pH of the polymer slurry is adjusted to be within a range of between about 3 and 12; the pH values of specific examples are set forth in Table 1. The pH is adjusted acidic by the addition of HCl and basic by the addition of NaOH, and then maintained at various pH values, as set forth in Table I. The polymeric composition is then recovered from the polymer slurry and dried.

When tetrasodium pyrophosphate is dissolved in water, it hydrolyzes to form the pyrophosphate anion, monohydrogen pyrophosphate, dihydrogen pyrophosphate, trihydrogen pyrophosphate and tetrahydrogen pyrophosphate. In the polymeric composition, the reaction product of tetrasodium pyrophosphate is calculated, in parts per hundred of vinylidene chloride interpolymer, as tetrasodium pyrophosphate.

The polymeric composition is extruded through a $\frac{3}{4}''$ extruder having a length to diameter ratio of 25/1. The extruder has the following set temperatures: (a) hopper temperature=160° C., (b) melt zone temperature =170° C., and (c) die temperature=175° C. The blends are passed to a $\frac{3}{4}''$ extruder die and extruded into a tape.

The polymeric composition is extruded into an extrudate tape in a continuous process for a period of about 20 minutes. As the resin decomposes it discolors, i.e. becomes brownish. The decomposition of the extruded resin is determined by visually inspecting the extrudate tape to determine its color. Color is qualitatively rated on a scale of 1 to 10 over a continuous range of discoloration, wherein 1 represents a creamy white color and 10 a rather dark brown.

The results are set forth in Table 1.

TABLE I

| Example | PS[1] | TSPP[2] | pH[3] | Color[4] |
|---|---|---|---|---|
| 1 | 100 | 0.25 | 6.0 | 4.9 |
| 2 | 100 | 0.25 | 7.0 | 1.8 |
| 3 | 100 | 0.25 | 7.2 | 2.6 |
| 4 | 100 | 0.25 | 7.5 | 1.4 |
| 5 | 100 | 0.25 | 8.3 | 1.4 |
| 6 | 100 | 0.25 | 8.7 | 2.0 |
| 7 | 100 | 0.25 | 8.9 | 2.0 |
| 8 | 100 | 0.25 | 10.5 | 3.1 |

[1] PS = polymer slurry of a monomer mixture, in one hundred parts of polymer, which is polymerized from an initial monomer loading of 94 weight percent vinylidene chloride monomer and 6 weight percent of methyl acrylate monomer.
[2] TSPP = tetrasodium pyrophosphate in parts per hundred parts of the polymer in the polymer slurry as added. The tetrasodium pyrophosphate is commercially available from the Monsanto Chemical Company.
[3] pH = pH of the aqueous phase of the polymer slurry after being charged with tetrasodium pyrophosphate and being adjusted.
[4] color = according to visual inspection.

As can be seen from the above table, the polymeric compositions can be extruded into extrudate tapes which possess excellent color, and optimum color is obtained when the pH of the aqueous phase is greater than about 6.

Example 9

The procedures of Example 5 are repeated with the following exception: the polymeric composition is extruded for a second time through a single strand die, passed through a water bath and then pelletized. The strand die had an internal diameter of 0.32 centimeter. Pelletizing was accomplished using a Model 304, 15.24-centimeter strand cutter commercially available from Conair Incorporated. The pellets are extruded into an extrudate tape in a continuous process for a period of about 20 minutes. The extrudate tapes of the extruded pellets exhibited good color.

Examples 10-11

The procedures of Examples 5 and 9 are repeated with the following exception: the monomer mixture comprises 80 weight percent of vinylidene chloride and 20 weight percent of vinyl chloride. The extrudate tapes of the polymeric composition exhibited good color.

Example 12

The procedures of Example 5 are repeated with the following exceptions: instead of addition of the 45 grams of tetrasodium pyrophosphate to the polymer slurry, 45 grams of tetrasodium pyrophosphate are added to the monomer mixture. The pH of the aqueous phase of the monomer mixture is adjusted to about 6.5. After polymerization, the pH of the polymer slurry is adjusted to values shown for Example 6. Thereafter, the polymer slurry is cooled down, unloaded and dewatered. The extrudate tapes from the extruded polymeric composition exhibited good color.

Example 13

The procedures of Example 12 are repeated with the following exceptions: the polymeric composition is extruded a second time through a single strand die, passed through a water bath, and then pelletized. The strand die had an internal diameter of 0.32 centimeter. Pelletizing was accomplished using a Model 304, 15.24-centimeter strand cutter commercially available from Conair Incorporated. The extrudate tapes of the extruded pellets exhibited good color.

Examples 14-15

The procedures of Examples 12-13 are repeated with the following exception: the monomer mixture comprises 80 weight percent of vinylidene chloride and 20 weight percent of vinyl chloride. The extrudate tapes of the polymeric compositions exhibited good color.

Example 16-19

The procedures of Example 5 are repeated with the following exceptions. Instead of adding 45 grams of tetrasodium pyrophosphate to the polymer slurry, 27 grams of orthophosphoric acid are added to the polymer slurry. The orthophosphoric acid is commercially available from the Fisher Scientific Company.

After addition, the pH of the polymer slurry is adjusted with sodium hydroxide to values shown in Table II.

When orthophosphoric acid is dissolved in water, it hydrolyzes to form dihydrogen phosphate, monohydrogen phosphate and the orthophosphate anion. In the polymeric composition, the reaction product of orthophosphoric acid is calculated, in parts per hundred of vinylidene chloride interpolymer, as trisodium orthophosphate.

Results of the examples are set forth in Table II.

TABLE II

| Example | PS[1] | OPA[2] | pH[3] | Color[4] |
|---|---|---|---|---|
| 16 | 100 | 0.25 | 5.4 | 7.5 |
| 17 | 100 | 0.25 | 7.2 | 5.0 |
| 18 | 100 | 0.25 | 10.0 | 2.3 |

TABLE II-continued

| Example | PS [1] | OPA [2] | pH [3] | Color [4] |
|---------|--------|---------|--------|-----------|
| 19 | 100 | 0.25 | 12.0 | 4.9 |

[1] PS = polymer slurry of a monomer mixture, in one hundred parts of polymer, which is polymerized from an initial monomer loading of 94 weight percent vinylidene chloride monomer and 6 weight percent of methyl acrylate monomer.
[2] OPA = orthophosphoric acid, calculated as trisodium phosphate in parts per hundred parts of the polymer in the polymer slurry. The orthophosphoric acid and sodium hydroxide are commercially available from the Fisher Scientific Company.
[3] pH = pH of the aqueous phase of the polymer slurry after being charged with orthophosphoric acid and adjusted basic with NaOH.
[4] color = according to visual inspection.

As can be seen from the above table, the polymeric compositions can be extruded into extrudate tapes which possess excellent color, and optimum color is obtained in the range from about 7 to about 12.

EXAMPLES 20

The procedures of Example 18 are repeated with the following exceptions: the polymeric composition is extruded a second time through a single strand die, passed through a water bath and then pelletized. The strand die had an internal diameter of 0.32 centimeter. Pelletizing was accomplished using a Model 304, 15.24-centimeter strand cutter commercially available from Conair Incorporated. The pellets are extruded into an extrudate tape in a continuous process for a period of about 20 minutes. The extrudate tapes of the extruded pellets exhibited good color.

Examples 21-22

The procedures of Examples 18 and 20 are repeated with the following exceptions: the monomer mixture comprises 80 weight percent of vinylidene chloride and 20 weight percent of vinyl chloride. The extrudate tapes of the polymeric compositions exhibited good color.

Example 23

The procedures of Example 18 are repeated with the following exceptions: instead of addition of the 8.5 grams of orthophosphoric acid to the polymer slurry, 8.5 grams of trisodium orthophosphate are added to the monomer mixture. The pH of the aqueous phase of the monomer mixture is adjusted to about 6.5.

After polymerization, the pH of the polymer slurry is adjusted to the values as shown for Example 19. Thereafter, the polymer slurry is cooled down, unloaded and dewatered. The extrudate tapes from the extruded polymeric composition exhibited good color.

EXAMPLE 24

The procedures of Example 23 are repeated with the following exceptions: the polymeric composition is extruded a second time through a single strand die, passed through a water bath, and then pelletized. The strand die had an internal diameter of 0.32 centimeter. Pelletizing was accomplished using a Model 304, 15.24-centimeter strand cutter commercially available from Conair Incorporated. The extrudate tapes of the extruded pellets exhibited good color.

Examples 25-26

The procedures of Examples 23 and 24 are repeated with the following exceptions: the monomer mixture comprises 20 weight percent of vinylidene chloride and 20 weight percent of vinyl chloride. The extrudate tapes of the polymeric compositions exhibited good color.

Example 27-32

The procedures of Example 5 are repeated with the exception that instead of adding 45 grams of tetrasodium pyrophosphate to the polymer slurry, 60 grams of oxalic acid are added to the polymer slurry. The oxalic acid is commercially available from the J. T. Baker Company.

After charging the oxalic acid into the polymer slurry, the pH of the polymer slurry is adjusted to values as shown in Table III. The pH of the aqueous phase of the polymer slurries is adjusted with NaOH and maintained at various pH's, as set forth in Table III.

When oxalic acid is dissolved in water, it hydrolyzes to form monohydrogen oxalate and the oxalate anion. In the polymeric composition, the reaction product of oxalic anion is calculated, in parts per hundred of vinylidene chloride interpolymer, as disodium oxalate.

Results of the examples are set forth in Table III.

TABLE III

| Example | PS [1] | SO [2] | pH [3] | Color [4] |
|---------|--------|--------|--------|-----------|
| 27 | 100 | 0.4 | 4 | 1 |
| 28 | 100 | 0.4 | 5 | 1 |
| 29 | 100 | 0.4 | 6.1 | 1.4 |
| 30 | 100 | 0.4 | 6.8 | 1 |
| 31 | 100 | 0.4 | 9.3 | 1.4 |
| 32 | 100 | 0.4 | 11 | 1 |

[1] PS = polymer slurry of a monomer mixture, in one hundred parts of polymer, which is polymerized from an initial monomer loading of 94 weight percent vinylidene chloride monomer and 6 weight percent of methyl acrylate monomer.
[2] SO = disodium oxalate, in parts per hundred parts of the polymer in the polymer slurry.
[3] pH = pH of the aqueous phase of the polymer slurry after being charged with oxalic acid and adjusted basic with NaOH.
[4] color = according to visual inspection.

As can be seen from the above table, the polymeric compositions can be extruded into extrudate tapes which possess excellent color, and optimum color is obtained at pH values of about 4 and greater.

Examples 33

The procedures of Example 30 are repeated with the following exceptions: the polymeric composition is extruded a second time through a single strand die, passed through a water bath and then pelletized. The strand die had an internal diameter of 0.32 centimeter. Pelletizing was accomplished using a Model 304, 15.24-centimeter strand cutter commercially available from Conair Incorporated. The pellets are extruded into an extrudate tape in a continuous process for a period of about 20 minutes. The extrudate tapes of the extruded pellets exhibited good color.

Examples 34-35

The procedures of Examples 30 and 33 are repeated with the following exceptions: the monomer mixture comprises 80 weight percent of vinylidene chloride and 20 weight percent of vinyl chloride. The extrudate tapes of the polymeric composition exhibited good color.

Example 36

The procedures of Example 30 are repeated with the following exceptions: instead of addition of the 8.5 grams of oxalic acid to the polymer slurry, 8.5 grams of sodium oxalate are added to the monomer mixture. The pH of the aqueous phase of the monomer mixture is adjusted to about 6.5.

After polymerization, the pH of the polymer slurry is adjusted to values as shown for Example 30. Thereafter, the polymer slurry is cooled down, unloaded and dewatered. The extrudate tapes from the extruded polymeric composition exhibited good color.

Example 37

The procedures of Example 38 are repeated with the following exceptions: the polymeric composition is extruded a second time through a single strand die, passed through a water bath and then pelletized. The strand die had an internal diameter of 0.32 centimeter. Pelletizing was accomplished using a Model 304, 15.24-centimeter strand cutter commercially available from Conair Incorporated. The extrudate tapes of the extruded pellets exhibited good color.

Examples 38-39

The procedures of Examples 36 and 37 are repeated with the following exceptions: the monomer mixture comprises 80 weight percent of vinylidene chloride and 20 weight percent of vinyl chloride. The extrudate tapes of the polymeric composition exhibited good color.

EXAMPLE 40

The procedures of Example 5 are repeated with the following exceptions: in addition to the 90 grams of tetrasodium pyrophosphate added to the polymer slurry, about 20 grams of maleic acid are added to the polymer slurry as well. The maleic acid is commercially available from the Fisher Scientific Company.

The results are set forth in Table IV.

TABLE IV

| Example | PS [1] | TSPP [2] | MA [3] | pH [4] | Color [5] |
|---|---|---|---|---|---|
| 40 | 100 | 0.5 | 0.1 | 9 | 1 |

[1] PS = polymer slurry of a monomer mixture, in one hundred parts of polymer which is polymerized from an initial monomer loading of 94 weight percent vinylidene chloride monomer and 6 weight percent of methyl acrylate monomer.
[2] TSPP = tetrasodium pyrophosphate in parts per hundred parts of the polymer in the polymer slurry as added.
[3] MA = maleic acid in parts per hundred parts of the polymer in the polymer slurry as added.
[4] pH = pH of the aqueous phase of the polymer slurry after being charged with tetrasodium pyrophosphate and maleic acid and being adjusted.
[5] color = according to visual inspection.

As can be seen from the above table, the polymeric compositions can be extruded into extrudate tapes which possess excellent color.

Example 41

The procedures of Example 40 are repeated with the following exception: the polymeric composition is extruded a second time through a single strand die, passed through a water bath and then pelletized. The strand die had an internal diameter of 0.32 centimeter. Pelletizing was accomplished using a Model 304, 15.24-centimeter strand cutter commercially available from Conair Incorporated. The pellets are extruded into an extrudate tape in a continuous process for a period of about 20 minutes. The extrudate tape of the extruded pellets exhibited good color.

Examples 42-43

The procedures of Examples 40 and 41 are repeated with the following exception: the monomer mixture comprises 80 weight percent of vinylidene chloride and 20 weight percent of vinyl chloride. The extrudate tapes of the polymeric composition exhibited good color.

Although the invention has been described in considerable detail, with reference to certain preferred embodiments thereof, it will be understood that variations and modifications can be affected within the spirit and scope of the invention as described above and as defined in the appended claims.

What is claimed is:

1. A process for preparing a vinylidene chloride polymer composition having improved extrudability comprising the steps of:
   (A) forming a polymerizable monomer mixture having an aqueous phase and a monomer phase, the monomer phase comprising from about 60 to about 99 weight percent of vinylidene chloride monomer and from about 40 to about 1 weight percent of at least one ethylenically unsaturated comonomer selected from the group consisting of vinyl chloride, alkyl acrylate, alkyl methacrylate, acrylic acid, methacrylic acid, itaconic acid, acrylonitrile and methacrylonitrile;
   (B) adding from about 0.001 to about 10 weight percent, based on the weight of the monomer mixture or polymer slurry, of at least one nonalkenic weak acid salt selected from the group consisting of alkali or alkaline earth metal phosphates, alkali or alkaline earth metal carboxylates, alkali or alkaline earth metal borates, alkali or alkaline earth metal alkyl phosphates, alkali or alkaline earth metal aryl phosphates, alkali or alkaline earth metal alkyl phosphites, alkali or alkaline earth metal aryl phosphites, alkali or alkaline earth metal alkyl sulfates and alkali or alkaline earth metal aryl sulphates to the polymerizable mixture in step (A) or to the polymer slurry in step (C);
   (C) polymerizing the polymerizable mixture to form a polymer slurry having an aqueous phase and a monomer phase;
   (D) maintaining the pH of the aqueous phase of the polymer slurry at an effective value to provide hydrolyzed salt species of the nonalkenic weak acid salt; and
   (E) drying the slurry to form a polymeric composition containing from about 0.01 to about 5 weight percent of the hydrolyzed salt species of the nonalkenic weak acid salt.

2. The method of claim 1, wherein the salt of a nonalkenic weak acid is a phosphate salt or derivatives thereof, and with the pH of the aqueous phase of the polymer slurry being basic of 5.

3. The method of claim 1, wherein the salt of a nonalkenic weak acid is added to either the monomer mixture or polymer slurry in an amount such that the resultant polymeric composition contains hydrolyzed salt species of a nonalkenic weak acid in an amount of from about 0.05 weight percent to about 3 weight percent, said weight percents being based on the total weight of the polymeric composition.

4. The method of claim 1, wherein the salt of a nonalkenic weak acid is added to either the monomer mixture or polymer slurry in an amount such that the resultant polymeric composition contains hydrolyzed salt species of the salt of a nonalkenic weak acid in an amount of from about 0.1 weight percent to about 1 weight percent, said weight percents being based on the total weight of the polymeric composition.

5. The method of claim 1, wherein the salt of a nonalkenic weak acid is selected from the group consisting of sodium phosphates, potassium phosphates; methyl trisodium pyrophosphate, sodium alkyl or aryl phosphates, phosphites and sulfates.

6. The method of claim 1, wherein the salt of a nonalkenic weak acid is selected from the group consisting of tetrasodium pyrophosphate, sodium pyrophosphate, sodium orthophosphate, and sodium polyphosphate.

7. The method of claim 1, wherein the salt of a nonalkenic weak acid is selected from the group consisting of potassium pyrophosphate, potassium orthophosphate, and potassium polyphosphate.

* * * * *

UNITED STATES PATENT AND TRADEMARK OFFICE
CERTIFICATE OF CORRECTION

PATENT NO. : 5,175,222

DATED : December 29, 1992

INVENTOR(S) : Stephen R. Betso, et al.

It is certified that error appears in the above-identified patent and that said Letters Patent is hereby corrected as shown below:

Title page:

Item (54), Title, reads " PROCESS FOR PREPARING EXTRUDABLE POLYMERIC VINYLIDENE CHLORIDE COMPOSITION " should read -- PROCESS FOR PREPARING EXTRUDABLE POLYMERIC COMPOSITION --.

Title Page, Related U. S. Application Data, Item 63, second line, delete " which is a continuation of Ser. No. 240,019, " and insert -- which is a continuation-in-part of Ser. No. 240,019, --.

Title Page, Abstract, Item 57, line 1, delete " polymer " and insert -- polymeric --.

Signed and Sealed this

Thirtieth Day of November, 1993

Attest:

BRUCE LEHMAN

Attesting Officer

Commissioner of Patents and Trademarks